J. H. GUGLER.
COMBINED PRIMARY AND SECONDARY BATTERY SYSTEM.
APPLICATION FILED JUNE 17, 1909.

940,008.

Patented Nov. 16, 1909.

UNITED STATES PATENT OFFICE.

JULIUS H. GUGLER, OF MILWAUKEE, WISCONSIN.

COMBINED PRIMARY AND SECONDARY BATTERY SYSTEM.

940,008.  Specification of Letters Patent.  Patented Nov. 16, 1909.

Application filed June 17, 1909. Serial No. 502,649.

*To all whom it may concern:*

Be it known that I, JULIUS H. GUGLER, of Milwaukee, Wisconsin, have invented a Combined Primary and Secondary Battery System, of which the following is a specification.

This invention relates to primary battery systems for the distribution of electricity, and more particularly to systems wherein a primary battery supplying current to the system is supported and regulated by a secondary battery or accumulator.

The object of my invention is to provide a certain distribution of end-cells of the secondary or regulating battery, and means for charging and discharging them.

More specifically, my object is to provide a device whereby any number of said end-cells may be charged and simultaneously any other number may be discharged into the service circuit, in conjunction with a construction which prevents any of said end-cells from being discharged at a time when it or they are not being charged from the primary source of current. It will be clear that if such a connection is not provided, it may happen that in some cases end-cells are being discharged at a time when they are not being charged, and such an event occurring at frequent intervals will lead to the overdischarge and degeneration of the end-cells.

In the accompanying drawings, I have illustrated several mechanical embodiments of my invention, and herein—

Figure 1:
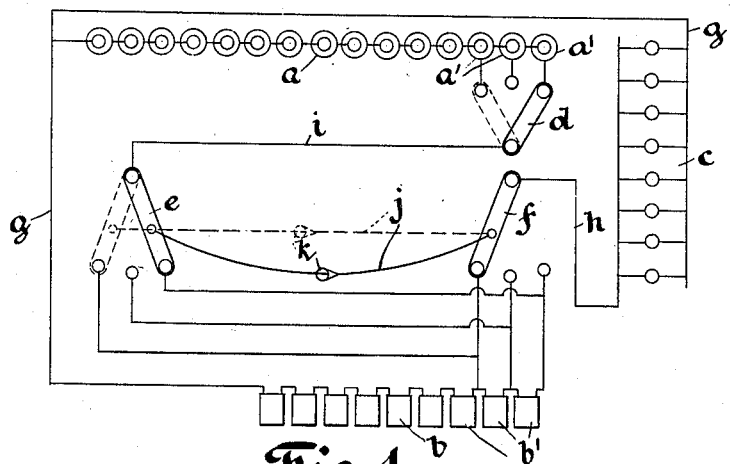
Figure 2:
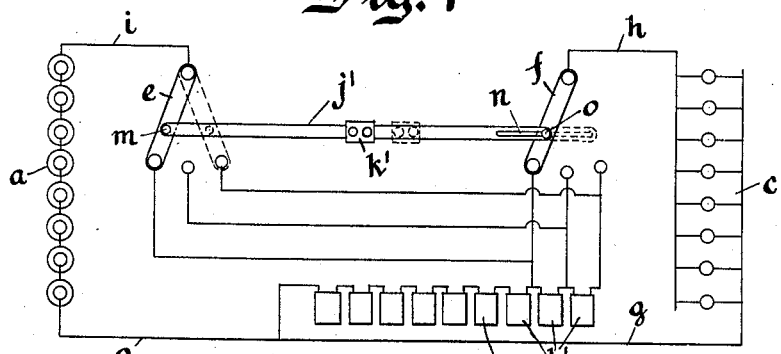
Figure 3:
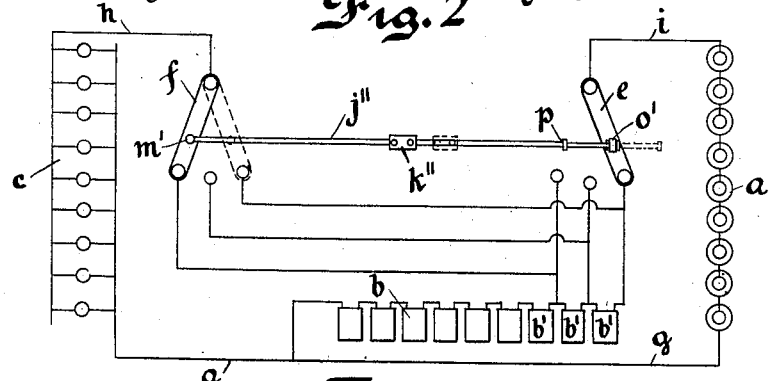

Figure 1 is a diagrammatic view illustrating one form of connection between the switches; Fig. 2 is a similar view showing a second form of connection; and Fig. 3 is a similar view showing a third form of such connection.

In all the drawings, $a$ represents the primary and $b$ the secondary battery; $c$, a lighting-, power-, or other service-system; $d$, a multipolar-switch to the several poles of which are connected the end-cells $a'$ of the primary battery; and $e$ and $f$ two multipolar switches, the several poles of each of which are respectively connected to the end-cells $b'$ of the secondary battery $b$, as shown. One terminal of each battery is connected by a lead $g$ to one terminal of the service-system $c$; and the other terminal of said service-system is connected by a lead $h$ with the switch-bar of the switch $f$ as shown. Furthermore, the other end of the battery $a$ is connected (through the switch $d$ where that is used) by a lead $i$ with the switch-bar of the switch $e$. Finally, there is a mechanical connection between the two switch-bars $e$ and $f$ which limits their movements with respect to one another, so that any of the end-cells $b'$ which are set by the switch $f$ to discharge into the service system $c$ are also connected by the switch $e$ in circuit with the charging battery $a$; and thereby any end-cell $b'$ is prevented from being discharged at any time unsupported by the battery $a$.

The connection between the switches may take various mechanical forms, and in Fig. 1 it is shown as a flexible connection such as a cord, chain or strap $j$, in which, if it is of a metallic or conducting nature, an insulator $k$ is interposed. The length of this connection is such that it is drawn tight whenever the two switch-bars $e$ and $f$ are on corresponding poles of their respective switches. When in such position the switch-bar $e$ can be shifted to the right so as to connect more end-cells to the charging-battery without disturbing the setting of the switch $f$, and in like manner the switch $f$ can be moved to the left to cut out one or more end-cells $b'$ from the discharging circuit without affecting the setting of the switch $e$; but should the switch $e$ be moved to the left it will drag with it the switch $f$ to a corresponding position; and in like manner should the switch $f$ be moved to the right it will drag with it the switch $e$, thus acting to include as many cells $b'$ in the charging circuit as are included in the discharging circuit.

In Fig. 2 the mechanical connection between the two switches is somewhat different, here taking the form of a bar $j'$ in two pieces divided electrically by an insulator $k'$; one end of said bar $j'$ being pivoted to a pin $m$ on the bar of the switch $e$, and the other having a slot $n$ therein which slides upon a pin $o$ on the bar of the switch $f$. The length of the bar $j'$ between the outer end of the slot and the pivoted end is equal to the distance between the corresponding pins $m$ and $o$ when the two switches are set in corresponding positions as previously described; so that the effect, as will be readily seen, is the same as in Fig. 1.

In Fig. 3 the two switches $e$ and $f$ have been transposed, and they are connected by a bar $j''$ which is electrically divided by an insulator $k''$. Said bar $j''$ is pivoted at one end on a pin $m'$ on the bar of one of the switches, for example the switch $f$, and at the other end slides in a ring $o'$ mounted on the bar of the other switch; and a collar $p$ is formed on the bar $j''$ in such position as to abut upon the ring $o'$ when the switch-bars of the two switches are in corresponding positions; then the switch $f$ cannot be moved to the right without also moving the bar $e$ correspondingly, and likewise the bar $e$ cannot be so moved without in like manner shifting the bar $f$.

From the foregoing description it will be seen that the construction may take various mechanical forms, to none of which, however, the invention is limited.

Having thus described my invention what I claim as new and desire to secure by Letters Patent is:

1. A system of electrical distribution comprising, in combination, a primary battery comprising a plurality of cells, a secondary battery comprising a plurality of cells, a service-circuit one pole of which is connected to one pole of said primary battery and to one pole of said secondary battery, a multipolar switch several poles of which are connected to successive end-cells on the free end of said primary battery, a pair of multipolar switches the fixed pole of one of which is connected to said first-named switch and the fixed pole of the other to the other pole of said service-circuit and the several movable poles of each of said pair of switches being connected to successive end-cells of said secondary battery in corresponding succession, and a mechanical connection between the movable elements of the respective switches which limits the position of the switch in the discharging-circuit to one of the poles connected to the cells in the charging-circuit.

2. A system of electrical distribution comprising a secondary battery, a primary battery connected to opposite poles thereof to charge said battery and a service-system connected to opposite poles thereof to discharge said battery, a multipolar switch interposed in the circuit between one end of said secondary battery and one end of said primary battery and the several poles of which are connected to the several end-cells of said secondary battery, a second multipolar switch interposed in the discharging-circuit between the same end of said secondary battery and said service-circuit, and the several poles of which are connected to the several end-cells of said secondary battery in the same manner as said first-named switch; and a connection between the moving-elements of the two switches limiting the adjustment of said last-named switch to poles corresponding to end-cells which are included in the charging-circuit.

3. A system of electrical distribution comprising, in combination with a secondary battery and a pair of multipolar-switches respectively connected to successive end-cells thereof, a service or discharging-circuit one pole of which is connected to one of said multipolar switches, a charging-circuit including a source of electric current one pole of which is connected to the other multipolar-switch, and the other pole of said discharging-circuit being connected to the other pole of said secondary-battery, a mechanical connection between the movable elements of said switches which prevents the discharging-switch from being moved to a position including more end-cells than are included by the charging-switch but permits it to be moved to a position including less end-cells than are included by the charging-switch and prevents said charging-switch from being moved to a position cutting out end-cells included in the discharging circuit but permits it to be moved to a position including cells not included in the discharging-circuit.

In witness whereof I have hereunto set my hand this 14th day of June 1909.

JULIUS H. GUGLER.

Witnesses:
A. H. BLATCHLEY,
JAS. C. PETERSON.